UNITED STATES PATENT OFFICE.

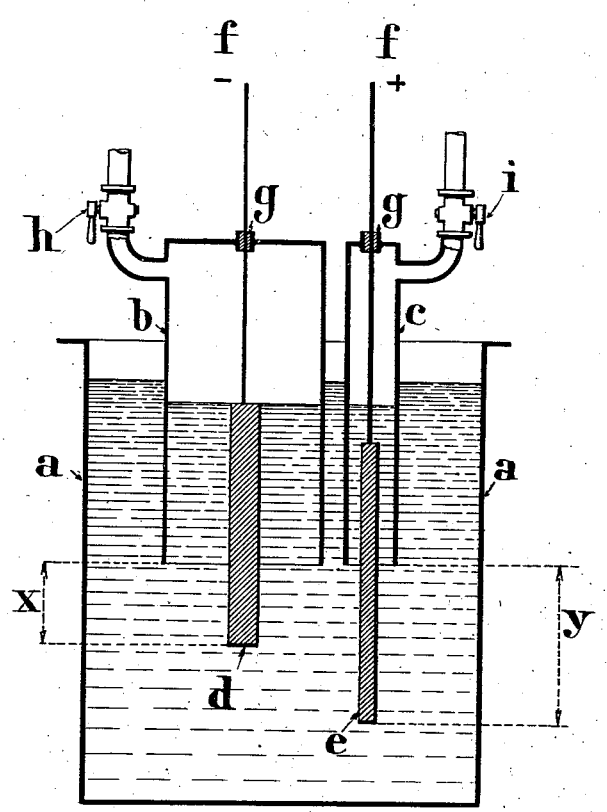

GEORGE FRANÇOIS JAUBERT, OF PARIS, FRANCE.

ELECTROLYTIC APPARATUS.

1,255,096.

Specification of Letters Patent.

Patented Jan. 29, 1918.

Application filed July 26, 1917. Serial No. 183,020.

*To all whom it may concern:*

Be it known that I, GEORGE FRANÇOIS JAUBERT, a citizen of the Swiss Republic, and residing in Paris, France, 155 Boulevard Malesherbes, have invented certain new and useful Improvements in and Relating to Electrolytic Apparatus, of which the following is a complete specification.

This invention relates to a process, and apparatus, for the electrolysis of compounds, water for instance, from which gases are produced and are to be collected separately.

In the process and apparatus at present in use for electrolysis, diaphragms are in general use which cause continual trouble and which diminish the efficiency of the operation, in consequence of their resistance to the flow of the current. The invention remedies these defects by eliminating the use of the diaphragm, at the same time enabling the two gases formed to be completely separated and enabling simple apparatus to be constructed and greatly improved efficiency to be obtained.

The accompanying drawings shows by way of example a constructional form of apparatus suitable for effecting the electrolysis of water.

In order to carry the process into operation bells are used similar to those of the bell voltameter, separated by a small space so as to decrease the resistance, and so constituted that the volume of each bell for collecting the gases set free during electrolysis is proportional to the quantity of gas set free on the corresponding electrode, while the surface of the electrodes projecting beyond the lower level of the bells is inversely proportional to the quantity of gas set free.

Hence for the electrolysis of water, where two volumes of hydrogen are obtained at the cathode and one volume of oxygen at the anode, a cathode having a small active surface covered by a bell of large dimensions and an anode having a large active surface covered by a bell of small dimensions will be utilized for carrying the invention into effect.

In the constructional form, shown in the drawing, of apparatus for the electrolysis of water, $a$ is a rectangular receptacle containing the electrolyte; $b$ is a bell of porcelain or other suitable material covering the cathode, for collecting the hydrogen formed; $c$ is the bell covering the anode, for collecting the oxygen formed; $d$ and $e$ are the metallic electrodes, of nickel for instance; $d$ is the cathode and $e$ the anode communicating with the current-supply leads or cables $f$ and $f$ which pass through the insulating sleeves $g$ of the bells $b$ and $c$ such sleeves $g$ being of ebonite, india-rubber or other suitable material; $h$ and $i$ are cocks arranged on tubes branched on to the bells $b$ and $c$ and enabling the gases formed to be collected.

The hydrogen bell $b$ is of large dimensions; the oxygen bell $c$ is of small dimensions; the hydrogen cathode $d$ has an active surface $x$ of small dimensions; the oxygen anode $e$ has an active surface $y$ of large dimensions.

The electrolyte may be acid or alkaline. A solution of caustic soda or caustic potash or of carbonate of soda or carbonate of potash of 10 or 20 per cent. concentration is preferably utilized. An electrolytic apparatus constructed in the manner indicated, as soon as it is connected to a source of continuous current, gives an abundant liberation of hydrogen and oxygen, while absorbing a voltage of about $2\frac{1}{2}$ volts.

On account of the proportional dimensioning of the bells and of the electrodes, and in spite of a very active liberation at the cathode, the hydrogen formed does not pass into the positive bell at all, just as the oxygen, which is liberated slowly at the anode, even though the latter is much larger than the cathode, does not pass into the negative bell.

The receptacle $a$ may be of wood, metal or any suitable material; the bells $b$ and $c$ may be of porcelain, metal or other suitable material; and the electrodes may be of nickel, cast iron, iron or any suitable material. The cocks $h$ and $j$ may be replaced by suitable collectors when several electrodes and bells of the same polarity are united in the same receptacle.

What I claim is:—

1. An electrolytic apparatus comprising a receptacle containing an electrolyte, a relatively large gas bell having its lower end disposed in the electrolyte, a relatively small gas bell also having its lower end disposed in the electrolyte, said gas bells being spaced apart, an electrode covered by each of said gas bells, the areas of the electrodes which are exposed to the action of the electrolyte being inversely proportional to the quantity of gas liberated in their respective bells.

2. An electrolytic apparatus comprising a receptacle containing an electrolyte, a relatively large gas bell having its lower end disposed in the electrolyte, a relatively small gas bell also having its lower end disposed in the electrolyte, each of said gas bells having an electrode, the active surface of the electrodes being inversely proportional to the quantity of gas liberated in their respective bells, and the volume of the corresponding bells being proportional to the volume of gas set free.

In testimony whereof I have hereunto set my hand at Paris (France), this sixth day of July, 1917.

GEORGE FRANÇOIS JAUBERT.

In the presence of two witnesses:
CHAS. P. PRESSLY,
EMILE BERTRAND.